(12) United States Patent
Burlatsky et al.

(10) Patent No.: US 7,615,107 B2
(45) Date of Patent: Nov. 10, 2009

(54) METHOD AND SYSTEM FOR CONTROLLING CONSTITUENTS IN AN EXHAUST STREAM

(75) Inventors: Sergei F. Burlatsky, West Hartfort, CT (US); Eric J. Gottung, Simsbury, CT (US); Venkata R. Vedula, Middletown, CT (US); Michael A. Sloan, West Harttford, CT (US); Vincent C. Nardone, South Windsor, CT (US); Bruce H. Easom, Groton, MA (US); Leo A. Smolensky, Concord, MA (US); Mark S. Berry, Birmingham, AL (US)

(73) Assignee: Southern Company Services, Inc., Birmingham, AL (US)

( * ) Notice: Subject to any disclaimer, the term of this patent is extended or adjusted under 35 U.S.C. 154(b) by 495 days.

(21) Appl. No.: 11/517,710

(22) Filed: Sep. 8, 2006

(65) Prior Publication Data

US 2008/0060518 A1     Mar. 13, 2008

(51) Int. Cl.
*B01D 53/04* (2006.01)
*B03C 3/14* (2006.01)
(52) U.S. Cl. .................. 96/57; 96/61; 96/116; 96/150
(58) Field of Classification Search .................. 95/58, 95/134; 96/15, 55, 57, 60, 61, 134, 143, 96/150, 116; 110/216, 203, 345; 60/311
See application file for complete search history.

(56) References Cited

U.S. PATENT DOCUMENTS 3,485,014 A * 12/1969 Nishimoto et al. ............ 95/110
4,006,066 A * 2/1977 Sparwald .................... 205/391
5,122,353 A * 6/1992 Valentine ............... 423/244.05
5,180,486 A   1/1993 Smolensky
5,591,253 A   1/1997 Altman
5,672,323 A * 9/1997 Bhat et al. .................. 422/172
5,683,494 A  11/1997 Altman
5,795,548 A * 8/1998 Madden et al. ............. 422/171
6,032,456 A   3/2000 Easom
6,372,025 B1  4/2002 Burlatsky
6,818,043 B1 * 11/2004 Chang et al. .................... 95/37
7,013,817 B2 * 3/2006 Stowe et al. ................. 110/345
2004/0076557 A1* 4/2004 Altman ........................ 422/171
2005/0244317 A1* 11/2005 Ahman et al. ............... 423/122

FOREIGN PATENT DOCUMENTS

CA    2030102     6/2000
EP    0 430 647 B1   4/1995

* cited by examiner

*Primary Examiner*—Frank M Lawrence
(74) *Attorney, Agent, or Firm*—Carlson, Gaskey & Olds, PC

(57) ABSTRACT

An emission treatment system includes a first separation device that is operable to introduce one or more sorbents into an exhaust stream having emission products. The sorbent captures the emission products such that the exhaust stream includes sorbent with captured emission products. A second separation device located downstream from the first separation device receives the exhaust stream and utilizes an electrostatic potential to separate the sorbent with captured emission products from the exhaust stream into a discharge stream to produce a clean stream.

15 Claims, 2 Drawing Sheets

METHOD AND SYSTEM FOR CONTROLLING CONSTITUENTS IN AN EXHAUST STREAM

BACKGROUND OF THE INVENTION

This invention relates to controlling emissions and, more particularly, to purifying an exhaust stream before release in the atmosphere.

Coal-fired power plants, vehicles, and the like typically produce an exhaust stream as a byproduct. The exhaust stream generally includes byproduct particles and emission gas containing sulfur, chlorine, mercury, or other pollutants.

A variety of devices exist to purify such exhaust streams. However, these devices typically have drawbacks that prevent widespread implementation. For example, many devices significantly obstruct through-flow of the exhaust stream, thereby resulting in a considerable pressure drop that limits purifying capacity of the device. Some devices also target only one type of pollutant in the exhaust stream, such as the byproduct particles, while neglecting removal of the gas byproduct. Furthermore, some devices operate inefficiently, are not cost effective, and are not even capable of removing a desirable amount of the pollutants from the exhaust stream. Thus, there is a need for a novel emission treatment method and system that is capable of removing byproduct particles and undesirable gases while providing a relatively low pressure drop. This invention addresses those needs while avoiding the shortcomings and drawbacks of the prior art.

SUMMARY OF THE INVENTION

An example emission treatment system includes a first separation device that is operable for introducing one or more sorbents into an exhaust stream. The exhaust stream has emission particles and emission gas, and the sorbents capture the emission gas such that the exhaust stream includes sorbent with captured emission and the emission particles. A second separation device located downstream from the first separation device receives the exhaust stream and establishes an electrostatic potential to separate the particles in the sorbent with captured emission gas from the exhaust stream into a discharge stream to produce a clean stream.

In another aspect, an example emission treatment system includes three separate and distinct separation devices that are operable to cooperatively separate emission gas and emission particles from an exhaust stream. A recycle passage between a first and a second of the three separation devices recirculates a portion of the exhaust stream. A third one of the three separation devices is disposed along the recycle passage to separate emission gas and emission particles from the recirculated portion of the exhaust stream.

An example emission treatment method includes the steps of introducing at least one sorbent into an exhaust stream having emission particles and emission gas, and capturing the emission gas with the sorbent such that the exhaust stream includes sorbent with captured emission gas and the emission particles. The particles in the sorbent with captured emission gas are then separated from the exhaust stream into a discharge stream using an electrostatic potential to produce a clean stream.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
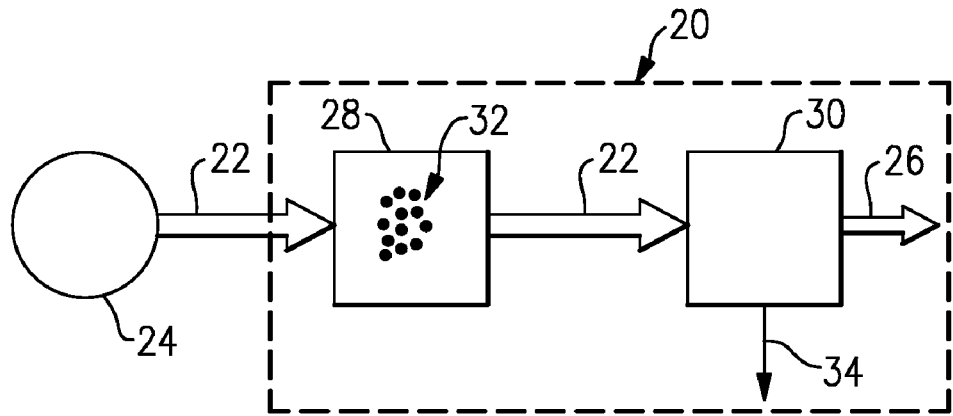
FIG. 1 schematically illustrates an example emission treatment system.

FIG. 1 schematically illustrates an example emission treatment system 20. In this example, the emission treatment system 20 receives an exhaust stream 22 from a source 24, such as a coal-fired power plant, vehicle, or the like. The exhaust stream 22 includes emission products such as emission particles and emission gas containing sulfur, chlorine, mercury, or other pollutants. The composition of the exhaust stream 22 will vary depending upon the source 24 and may include other types of gases and varying concentrations of emission particles. As will be described below, the emission treatment system 20 provides the benefit of efficiently separating at least a portion of the emission particles and the emission gas from the exhaust stream 22 to produce a clean stream 26 with the added benefit of relatively low pressure drop.

In the illustrated example, the emission treatment system 20 includes a first separation device 28 and a second separation device 30 that cooperate to separate the emission particles and the emission gas from the exhaust stream 22. However, in other examples, the exhaust stream may not contain emission particles or may contain only a small concentration of emission particles. The first separation device 28 introduces one or more types of sorbents 32 into the exhaust stream 22 to capture the emission gas. In one example, the sorbent 32 includes an activated carbon sorbent, a calcium-based sorbent, a magnesium-based sorbent, a sodium-based sorbent, or mixtures thereof to capture the emission gasses. The particular types of sorbents 32 selected and the ratio in which they are used may be selected to target particular types of emission gas within the exhaust stream 22. For example, if it is known that the exhaust stream 22 includes relatively high levels of mercury, a relatively high amount of activated carbon sorbent may be used to target capture of the mercury. Likewise, other types of sorbents 32 are selected to target other types of emission gas. One of ordinary skill in the art who has the benefit of this disclosure will be able to select particular sorbents 32 and ratios to meet their particular needs.

The exhaust stream 22 and sorbent 32 with captured emission gas is discharged from a first separation device 28 into the second separation device 30. The second separation device 30 establishes an electrostatic potential to separate the emission particles and the sorbent with captured emission gas from the exhaust stream 22. The second separation device 30 produces a discharge stream 34 that includes the separated particles and the sorbent with captured emission gas and the clean stream 26, which includes less particles and emission gas than the input exhaust stream 22. By capturing the emission gasses with the sorbent 32, the emission treatment system 20 provides the advantage of removing the emission gasses and the emission particles from the exhaust stream 22, whereas some prior devices only remove particles from an exhaust stream. Moreover, as will be described below, the first separation device 28 and the second separation device 30 do not significantly obstruct the flow of the exhaust stream 22 through the emission treatment system 20.

Figure 2:
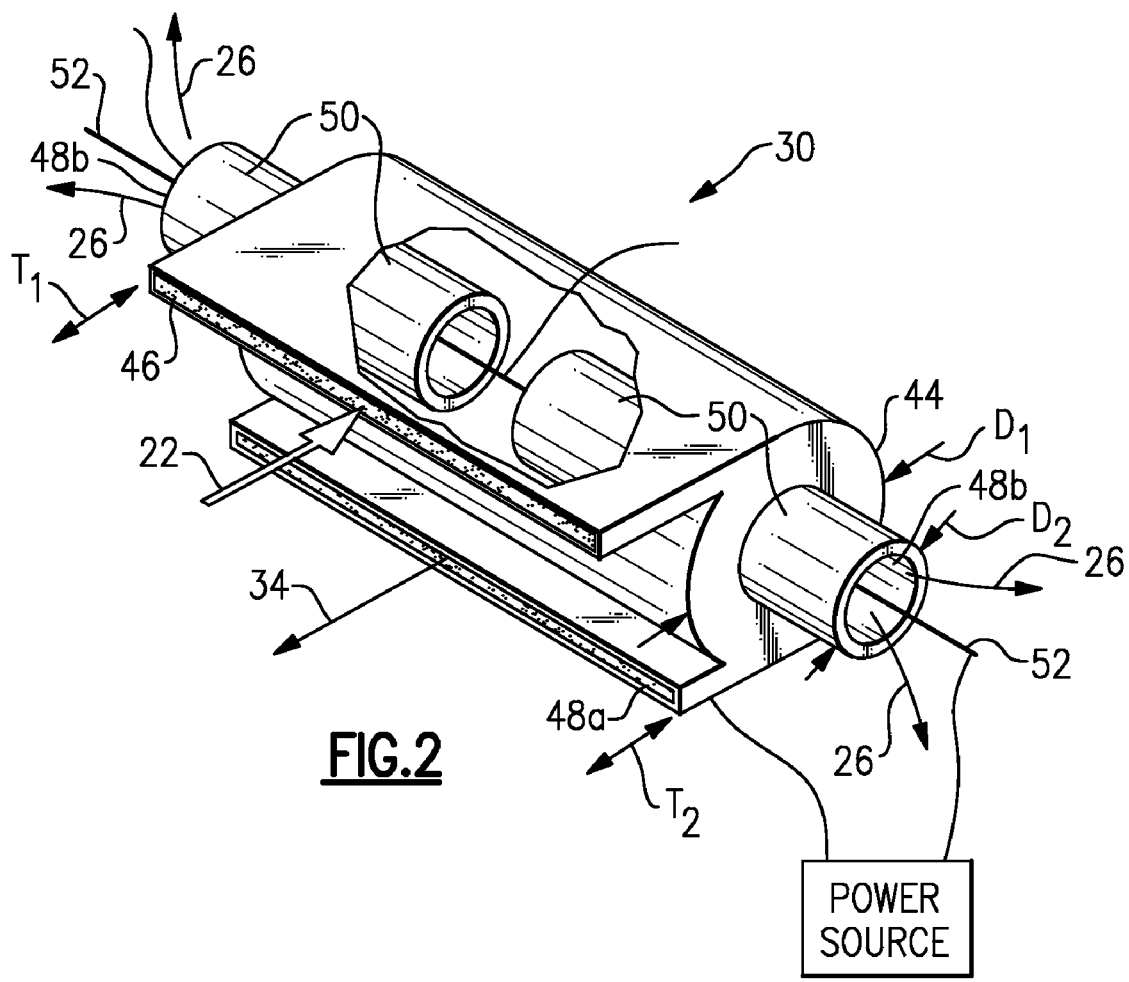
FIG. 2 illustrates selected portions of an example second separation device depicted in FIG. 1.

FIG. 2 illustrates selected portions of an example second separation device 30 for use in the emission treatment system 20. In this example, the second separation device 30 includes a cylindrical vessel 44 having an inlet 46 that receives the exhaust stream 22, a first outlet 48a that discharges the discharge stream 34, and a second outlet 48b that discharges the clean stream 26. Although the example actually shows two second outlets 48b, it is to be understood that the example can be modified to include a single second outlet 48b or additional second outlets 48b.

The inlet 46 extends in a tangential direction $T_1$ relative to the cylindrical vessel 44. The first outlet 48a extends in a second tangential direction $T_2$ relative to the cylindrical vessel 44. The tangential flow of the exhaust stream 22 through the inlet 46 into the cylindrical vessel 44 causes the exhaust stream 22 to swirl within the cylindrical vessel 44 to create a vortex. The vortex produces centrifugal forces on the emission particles and sorbent with captured emission gas that urge these pollutants toward the perimeter of the cylindrical vessel 44.

In the illustrated example, the second outlet 48b includes a cylindrical tube 50 that extends at least partially within the cylindrical vessel 44. In this example, the cylindrical vessel 44 includes a first diameter $D_1$ and the cylindrical tube includes a second diameter $D_2$ that is smaller than the first diameter $D_1$.

An electrode 52 extends axially through the cylindrical tube 50 and the cylindrical vessel 44. The electrode 52 is connected in a known manner to a power source (shown schematically), which is connected also to the cylindrical tube 44 to create an electrostatic potential (i.e., electric field) between the electrode 52 and the cylindrical vessel 44. The electrostatic potential drives the emission particles and the sorbent with captured emission gas toward the perimeter of the cylindrical vessel 44, in combination with the centrifugal force that is created by the vortex. In one example, the emission particles and sorbent with captured emission gas are electrostatically charged in a known manner to enhance interaction with the electric field to drive the emission particles and the sorbent with captured emission gas toward the perimeter. Once near the perimeter, the particles and sorbent with captured emission gas exit through the first outlet 48a as the discharge stream 34 (i.e., a bleed flow). The remaining exhaust stream 22 that is swirling within the cylindrical vessel 44, which is now depleted of the emission particles and sorbent with captured emission gas, discharges through the second outlet 48b as the clean stream 26. Although the example shows certain details, one of ordinary skill in the art who has a benefit of this description will recognize that certain modifications can be made to the second separation device 30 to meet their particular needs.

The example shown in FIG. 2 provides the advantage of relatively efficiently separating the emission particles and sorbent with captured emission gas from the exhaust stream 22 without obstructing the flow of the exhaust stream 22 to the second outlet 48b. This results in a relatively low pressure drop. In one example, approximately 90% of the total exhaust stream 22 flow exits as the clean stream 26 with approximately 10% of the total exhaust stream 22 flow exits as the discharge stream 34.

Figure 3:
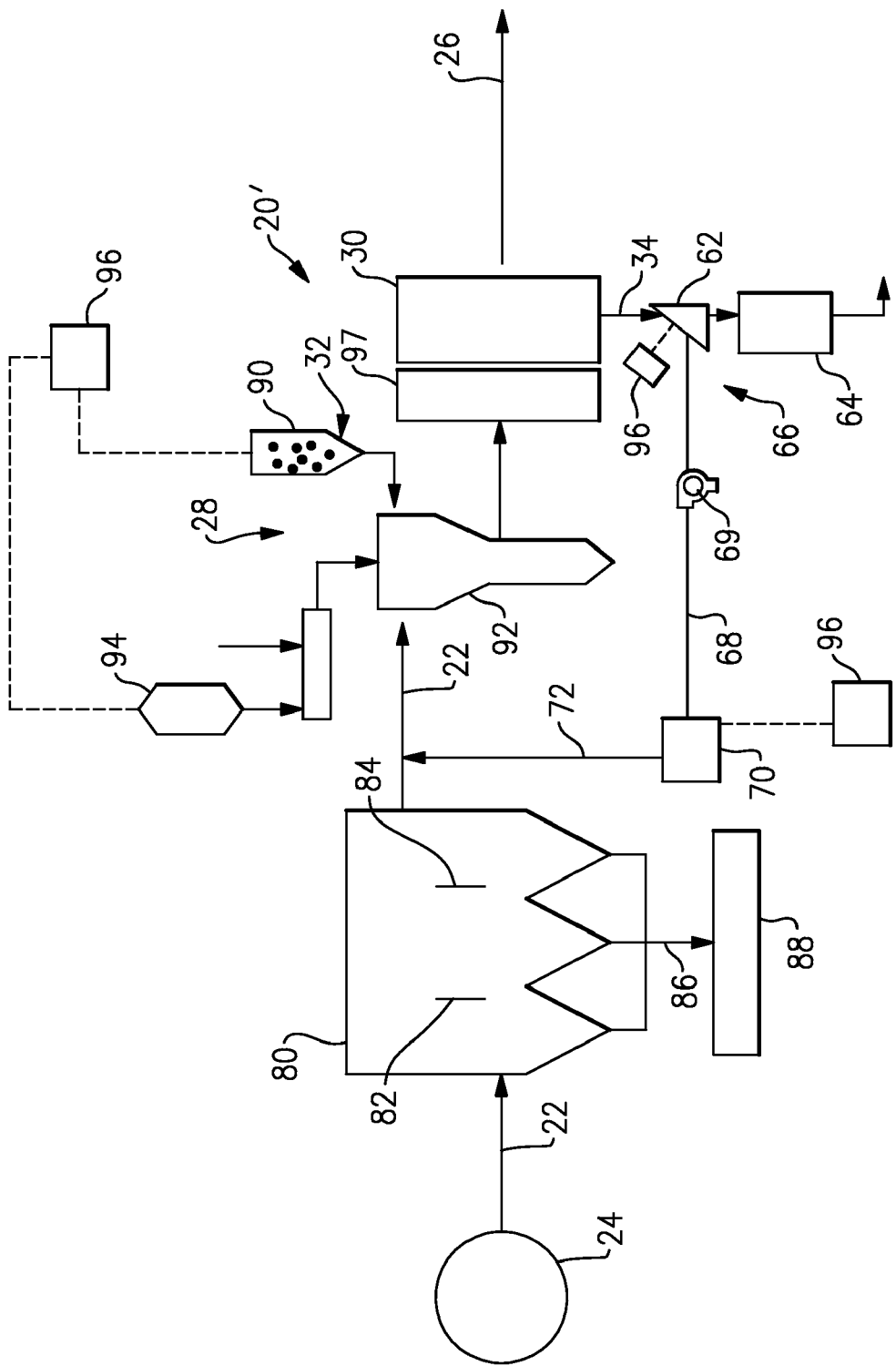
FIG. 3 shows selected portions of a second embodiment of an example emission treatment system.

FIG. 3 schematically illustrates selected portions of another example emission treatment system 20'. In this example, the emission treatment system 20' includes several additional components to enhance separation of the emission particles and the emission gas from the exhaust stream 22. It is to be understood that the features described below may be used as shown or in various combinations with the first separation device 28 and the second separation device 30.

In the illustrated example, the emission treatment system 20' includes a third separation device 62 that receives the discharge stream 34 from the second separation device 30. In one example, the third separation device 62 includes a classifier, such as a cyclone classifier, that utilizes centrifugal forces to separate the emission particles from the sorbent with captured emission gas. For example, the sorbent with captured emission gas is heavier or larger in size relative to the weight or size of the emission particles. Optionally, the emission particles are collected in receptacle 64 and discarded as desired.

In the illustrated example, the third separation device 62 is within a recycle passage 66 that extends between the second separation device 30 and the first separation device 28. The third separation device 62 discharges at least a portion of the separated sorbent with captured emission gas in a second discharge stream 68 to a regeneration device 70. Optionally, a circulation fan 69 may be used to move the discharge stream 68. The regeneration device 70 regenerates the sorbent with captured emission gas to produce regenerated sorbent that is again capable of capturing emission gasses. In one example, the regeneration device 70 uses heat or other known method of regeneration.

The regeneration device 70 discharges the regenerated sorbent into a third discharge stream 72 that is received into the first separation device 28. Thus, the recycle passage 66 provides the benefit of re-using (i.e., recycling) at least a portion of the sorbent 32 that is introduced into the exhaust stream 22 instead of, for example, discarding the sorbent once it captures emission gas. In some examples, this may increase the efficiency of the system.

Optionally, the recycle passage 66 does not include the regeneration device 70. In this example, the sorbent with captured emission gas that is separated using the third separation device 62 is introduced directly back into the first separation device 28 without regeneration. In this example, not all of the sorbent 32 that is introduced into the exhaust stream 22 captures emission gas and some of the sorbent 32 that does capture emission gas has additional capturing capacity. Thus, using the recycle passage 66 to re-introduce the sorbent with captured emission gas from the discharge stream 34 may provide the benefit of re-using the sorbent 32 to increase the efficiency of the emission treatment system 20' while avoiding having to discard the sorbent with captured emission gas after one cycle.

In the illustrated example, the emission treatment system 20' also includes a fourth separation device 80 for enhanced exhaust stream 22 emission control. In this example, the fourth separation device 80 is an electrostatic precipitator that is located upstream of the first separation device 28 to receive the exhaust stream 22 from the source 24. The electrostatic precipitator of the fourth separation device 80 includes a discharge electrode 82 and a collection electrode 84 that produce an electrostatic potential (i.e., electric field) there between to collect at least a portion of the emission particles from the exhaust stream 22 before the exhaust stream 22 enters the first separation device 28. The captured emission particles are then discharged in a fourth discharge stream 86 to a receptacle 88. The fourth separation device 80 provides the benefit of reducing some of the burden on the first separation device 28, second separation device 30, and third separation device 62 of having to remove emission particles from the exhaust stream 22, thereby increasing the overall ability of the emission treatment system 20' to purify the exhaust stream 22.

In the illustrated example, the first separation device 28 includes an injector 90 for introducing the sorbent 32 into a scrubber 92 with, optionally, water from a water injector 94. The water, sorbent 32, and exhaust stream 22 intermix in the scrubber 92, which facilitates contact between the sorbent 32 and the emission gas for improved capture of the emission gas.

Optionally, a precharger 97 is located between the first separation device 28 and the second separation device 30 to electrostatically charge the emission particles and sorbent with captured emission gas before entry into the second separation device 30. Precharging increases the effectiveness of the electrostatic potential within the cylindrical vessel 44 to drive the emission particles and sorbent with captured emission gas toward the vessel perimeter. Alternatively, instead of or in addition to using the precharger 97, the second separation device 30 electrostatically charges the emission particles and sorbent with captured emission gas. In one example, the electrode 52 and the cylindrical vessel 44 generate a corona discharge there between to electrostatically charge the emission particles and sorbent with captured emission gas.

As shown in the illustrated example, the emission treatment system 20' includes a controller 96 in electrical communication with the third separation device 62, the regeneration device 70, and the first separation device 28. Although the illustration shows three instances of the controller 96 for convenience in the drawing, the controller 96 is may actually be a single unit in this example that controls operation of the emission treatment system 20'. A controller 96 may also communicate with any of the other features of the emission treatment system 20', such as the second separation device 30 and fourth separation device 80.

In this example, the controller 96 monitors the operation of each of the connected devices to maintain a desired operational state of the emission treatment system 20'. For example, the controller 96 monitors and selectively controls the flow of new, virgin sorbent 32 into the scrubber 92. The controller 96 also selectively controls the flow of the second discharge stream 68 from the third separation device 62 such that all of, none of, or some of the pollutants separated by the third separation device 62 are discharged into the third discharge stream 68. Additionally, the controller 96 monitors and controls the regeneration device 70 to selectively control the amount of regenerated sorbent discharged into the third discharge stream 72 back into the first separation device 28. The controller 96 can thereby control a ratio of new, virgin sorbent 32 introduced from the first separation device 28 to the amount of regenerated sorbent introduced from the regeneration device 70. This provides the benefit of achieving a desired recycle efficiency of the emission treatment system 20'.

In the illustrated examples, the emission treatment system 20, 20' provides the benefit of separating emission particles and emission gasses from the exhaust stream 22 while providing relatively low pressure drop. This allows the emission treatment system 20, 20' to be retrofit to preexisting sources 24, removal of a greater amount of pollutants from the exhaust stream 22, and greater flexibility in targeting particular types of pollutants compared to conventional devices. Furthermore, the emission treatment system 20, 20' may reduce maintenance costs that typically accompany conventional devices, such as fabric filters. Additionally, as the examples demonstrate, a variety of features may be utilized with the first and second separation devices 28 and 30 to further enhance the separating capabilities as desired. Thus, the emission treatment system 20, 20' provides a flexible, efficient, and inexpensive solution for controlling exhaust emissions.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. An emission treatment system comprising:
   a first separation device operable for introducing at least one sorbent into an exhaust stream having emission products, the at least one sorbent for capturing the emission products such that the exhaust stream includes sorbent with captured emission products;
   a second separation device downstream from the first separation device for receiving the exhaust stream and establishing an electrostatic potential to separate the sorbent with captured emission products from the exhaust stream into a discharge stream to produce a clean stream;
   a recycle passage between the first separation device and the second separation device for recirculating at least a portion of the at least one sorbent, the recycle passage including a regenerator for regenerating sorbent with captured emission products and producing regenerated sorbent; and
   a controller in communication with at least the first separation device and the regenerator, and the controller is configured to control a rate of introduction of the at least one sorbent into the first separation device and a rate of introduction of regenerated sorbent from the regenerator into the first separation device.

2. The system as recited in claim 1, wherein the second separation device comprises a cylindrical vessel having an inlet that provides tangential flow of the exhaust stream into the cylindrical vessel, a first outlet that provides tangential flow of particles and sorbent with captured emission gas out of the cylindrical vessel, and at least one second outlet for discharging the clean stream.

3. The system as recited in claim 2, wherein the second separation device further comprises an electrode within the cylindrical vessel for establishing the electrostatic potential between the electrode and walls of the separation vessel.

4. The system as recited in claim 3, wherein the second outlet comprises at least one cylindrical tube that extends at least partially within the cylindrical vessel, wherein the cylindrical vessel includes a first diameter and the cylindrical tube includes a second diameter that is less than the first diameter.

5. The system as recited in claim 1, wherein the at least one sorbent comprises multiple different sorbents selected from the group consisting of activated carbon sorbents, calcium based sorbents, magnesium based sorbents, and sodium based sorbents.

6. The system as recited in claim 1, further comprising a third separation device that includes a classifier along the recycle passage.

7. The system as recited in claim 1, further comprising a fourth separation device that includes an electrostatic precipitator upstream from the first separation device, wherein the electrostatic precipitator includes a discharge electrode and a collection electrode for separating a portion of the emission products from the exhaust stream before the exhaust stream enters the first separation device.

8. An emission treatment system comprising:
three separate and distinct separation devices operable to cooperatively separate emission products from an exhaust stream;
a recycle passage for recirculating a portion of the exhaust stream between a first and a second of the three separation devices, wherein a third one of the three separation devices is disposed along the recycle passage to separate emission products from the recirculated portion of the exhaust stream; and
a controller in communication with at least the first separation device and the recycle passage, and the controller is configured to control a rate of introduction of at least one sorbent into the first separation device and a rate of introduction of regenerated sorbent from the recycle passage into the first separation device.

9. The system as recited in claim 8, wherein the first separation device includes at least one sorbent for capturing the emission products such that the exhaust stream includes sorbent with captured emission gas and the particles.

10. The system as recited in claim 9, wherein the second separation device includes a cylindrical vessel having an inlet that provides tangential flow of the exhaust stream into the cylindrical vessel, a first outlet that provides tangential flow of sorbent with captured emission products out of the cylindrical vessel, and at least one second outlet for discharging the clean stream.

11. The system as recited in claim 10, wherein the third separation device includes a classifier.

12. The system as recited in claim 1, wherein the controller is configured to control a ratio of an amount of the at least one sorbent introduced into the first separation device to an amount of regenerated sorbent introduced from the regenerator into the first separation device.

13. The system as recited in claim 1, wherein the at least one sorbent is virgin sorbent, and the controller is configured to control a ratio of an amount of the virgin sorbent introduced into the first separation device to an amount of the regenerated sorbent from the regenerator into the first separation device.

14. The system as recited in claim 8, wherein the controller is configured to control a ratio of an amount of the at least one sorbent introduced into the first separation device to an amount of regenerated sorbent introduced from the regenerator into the first separation device.

15. The system as recited in claim 8, wherein the at least one sorbent is virgin sorbent, and the controller is configured to control an amount of the virgin sorbent introduced into the first separation device to an amount of the regenerated sorbent introduced from the regenerator into the first separation device.

* * * * *

UNITED STATES PATENT AND TRADEMARK OFFICE
CERTIFICATE OF CORRECTION

PATENT NO. : 7,615,107 B2
APPLICATION NO. : 11/517710
DATED : November 10, 2009
INVENTOR(S) : Burlatsky et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 558 days.

Signed and Sealed this

Nineteenth Day of October, 2010

David J. Kappos
*Director of the United States Patent and Trademark Office*